(12) United States Patent
Ikeuchi et al.

(10) Patent No.: US 6,809,158 B2
(45) Date of Patent: Oct. 26, 2004

(54) WATER-ABSORBING AGENT AND PROCESS FOR PRODUCING THE SAME

(75) Inventors: Hiroyuki Ikeuchi, Himeji (JP); Nobuyuki Harada, Suita (JP); Yoshihiko Masuda, Takarazuka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/968,514

(22) Filed: Oct. 2, 2001

(65) Prior Publication Data

US 2002/0072471 A1 Jun. 13, 2002

(30) Foreign Application Priority Data

Oct. 20, 2000 (JP) .................................... 2000-321740

(51) Int. Cl.$^7$ ................................................. C08F 8/30
(52) U.S. Cl. ................ 525/375; 525/329.1; 525/329.2; 525/329.4; 525/330.2; 525/330.6; 525/383
(58) Field of Search ................................ 525/375, 383

(56) References Cited

U.S. PATENT DOCUMENTS

| | | | |
|---|---|---|---|
| 4,043,952 A | 8/1977 | Ganslaw et al. | 260/17.4 |
| 4,051,086 A | 9/1977 | Reid | 260/17.4 |
| 4,666,983 A | 5/1987 | Tsubakimoto et al. | 525/119 |
| 4,734,478 A | 3/1988 | Tsubakimoto et al. | 527/300 |
| 5,164,459 A | 11/1992 | Kimura et al. | 525/384 |
| 5,366,591 A * | 11/1994 | Jewell | 162/9 |
| 5,409,771 A | 4/1995 | Dahmen et al. | 428/327 |
| 5,779,857 A * | 7/1998 | Norlander | 162/157.6 |

FOREIGN PATENT DOCUMENTS

| | | |
|---|---|---|
| DE | 4020780 | 8/1991 |
| EP | 0827753 | 3/1988 |
| EP | 0349240 | 1/1990 |
| EP | 0 482 836 A | 4/1992 |
| EP | 0761241 | 3/1997 |
| EP | 0999238 | 5/2000 |
| JP | 51136588 | 11/1976 |
| JP | 52117393 | 10/1977 |
| JP | 58180233 | 10/1983 |
| JP | 5980459 | 5/1984 |
| JP | 59189103 | 10/1984 |
| JP | 6116903 | 1/1986 |
| JP | 6169854 | 4/1986 |
| JP | 6117542 | 5/1986 |
| JP | 61211305 | 9/1986 |
| JP | 61252212 | 11/1986 |
| JP | 61257235 | 11/1986 |
| JP | 61264006 | 11/1986 |
| JP | 627745 | 1/1987 |
| JP | 63105064 | 5/1988 |
| JP | 9136966 | 5/1997 |
| JP | 9509591 | 9/1997 |
| JP | 0197818 | 7/2000 |
| WO | 9522356 | 8/1995 |
| WO | WO 97 49686 A | 12/1997 |
| WO | 9942494 | 8/1999 |
| WO | 9943720 | 9/1999 |
| WO | 0031153 | 6/2000 |

OTHER PUBLICATIONS

Abstract 1996:387211 of "Composite Polymeric Materials Containing Electret Components", Vertiachikh et al, International Journal of Polymeric Materials, 33(1–2), 95–101, 1996.*

* cited by examiner

Primary Examiner—Bernard Lipman
(74) Attorney, Agent, or Firm—Roylance, Abrams, Berdo & Goodman, L.L.P.

(57) ABSTRACT

The present invention provides: a process for producing a water-absorbing agent at low temperature in a short time, wherein the water-absorbing agent has excellent balance between the absorption capacity without load and the absorption capacity under a load, high fluidity under a hygroscopic atmosphere, and excellent safety; and a novel water-absorbing agent and a novel crosslinking agent particularly suitable for crosslinking water-absorbent resins. The water-absorbing agent, having excellent balance between the absorption capacity without load and the absorption capacity under a load, high fluidity under a hygroscopic atmosphere, and excellent safety, can be obtained by using an oxetane compound and/or an imidazolidinone compound for a water-absorbent resin.

35 Claims, 1 Drawing Sheet

WATER-ABSORBING AGENT AND PROCESS FOR PRODUCING THE SAME

BACKGROUND OF THE INVENTION

A. Technical Field

The present invention relates to a process for producing a water-absorbing agent, and a water-absorbing agent.

B. Background Art

In recent years, water-absorbent resins (water-absorbing agents) are widely used as one of materials constituted of absorbent articles, such as disposable diapers, sanitary napkins, and incontinent pads, for the purpose of causing the water-absorbent resins absorb body fluids.

The above-mentioned water-absorbent resins (also called as higher-water-absorbing resins or water-absorbent polymers) are, for example, disclosed in Japanese Industrial Standard (JIS) K7223-1996, and was already well known.

Known examples of the above water-absorbent resins are as follows: crosslinked products of partially neutralized polyacrylic acids; hydrolyzed products of starch-acrylic acid graft polymers; saponified products of vinyl acetate-acrylic acid ester copolymers; hydrolyzed products of acrylonitrile- or acrylamide copolymers, and their crosslinked products; and crosslinked polymers of cationic monomers.

Examples of the properties which the above water-absorbent resins should have are as follows: upon contact with aqueous liquids such as body fluids, excellent water absorption amount or speed, the liquid permeability, the gel strength of the swollen gel, the suction power to suck up water from a base material containing aqueous liquids from the past. Then, when the water-absorbent resins have a plurality of these properties together from the past, and used as absorbent articles, such as disposable diapers, and sanitary napkins, various water-absorbent resins (water-absorbing agents) displaying excellent performance (absorbing property) are proposed.

For example, as to a method for improving the water-absorption properties of the water-absorbent resin, such as absorption capacity without load and absorption capacity under a load in good balance, there is a known art in which the surface neighborhood of the water-absorbent resin is crosslinked, and various methods have ever been proposed.

For example, there are known methods in which the following materials are used: polyhydric alcohols (JP-A-180233/1983 and JP-A-016903/1986); polyglycidyl compounds, polyaziridine compounds, polyamine compounds, or polyisocyanate compounds (JP-A-189103/1984); glyoxal (JP-A-117393/1977); polyvalent metals (JP-A-136588/1976, JP-A-257235/1986 and JP-A-007745/1987); silane coupling agents (JP-A-61-211305, JP-A-61-252212, and JP-A-61-264006); alkylene carbonates (DE 4020780); oxazolidinones (WO 99/43720); oxazines (WO 00/311539); and oxazoline compounds (JP-A-197818/2000).

In addition, as to water-absorbent articles such as diapers, the amount of water-absorbent resins as used tends to increase. Therefore, when various water-absorbent articles such as diapers are produced by use of water-absorbent resins, it is necessary to include a plenty of highly hygroscopic water-absorbent resin powders in fiber base materials, and there is a problem such that the water-absorbent articles cannot be produced stably because the water-absorbent resin powders each other cause blocking in a hopper or in the middle of a production line, or are attached to apparatuses depending upon its working circumstances, or climate conditions (especially, in an area having high temperature and high humidity). That is to say, the water-absorbent resins are often produced as powders. Therefore, the fluidity of the powders, especially the fluidity under a hygroscopic atmosphere is important for a practical use.

There are known methods in order to solve the fluidity under such a hygroscopic atmosphere: compositions obtained by blending water-absorbent resin powders with a hydrophobic silica fine particles in a specific ratio (JP-B-17542/1986); compositions obtained by blending water-absorbent resin powders and inorganic particles, such as water-containing silicon dioxide, water-containing aluminum dioxide, and water-containing titanium dioxide (JP-A-80459/1984); methods which involve treating water-absorbent resins with specific cationic surfactants, and thereafter blending inorganic substances or high-melting-point organic compounds (JP-A-69854/1986); methods which involve blending water-absorbent resin powders with stearic acid and inorganic particles (JP-A-105064/1988); and methods which involve treating water-absorbent resins with specific silicone surfactants (JP-A-136966/1997).

However, there is a problem of cost of the additives or safety of powder dusts in conventional arts, and further there are many problems such that: the production process for water-absorbent resins are complicated, or the properties of the water-absorbent resins are decreased. Therefore, water-absorbent resins (water-absorbing agents), obtained by modifying the balance between the absorption capacity without load and the absorption capacity under a load and the fluidity under a hygroscopic atmosphere, were insufficient.

Furthermore, there is a problem of safety of the crosslinking agent as used. When the crosslinking agent is a compound having a reactive functional group such as an epoxy group in general, the reaction can be carried out at low temperature. However, there are problems such that: it is necessary to strictly control the residual amount of the crosslinking agent because the crosslinking agent itself is irritant to skins; and complicated procedures are necessary in the processes to reduce the residual amount. In addition, safe crosslinking agents such as polyhydric alcohols have low reactivity. Therefore, they require a high temperature or long time in the crosslinking reaction. There is a possibility that the water-absorbent resins are colored or deteriorated due to heating.

SUMMARY OF THE INVENTION

A. Objects of the Invention

The present invention was completed in accordance with the above-mentioned conventional problems. That is to say, an object of the present invention is to provide: a process for producing a water-absorbing agent at low temperature in a short time, wherein the water-absorbing agent has excellent balance between the absorption capacity without load and the absorption capacity under a load, high fluidity under a hygroscopic atmosphere, and excellent safety. In addition, another object of the present invention is to provide: a novel water-absorbing agent, and a novel crosslinking agent particularly suitable for crosslinking water-absorbent resins.

B. Disclosure of the Invention

The present inventors diligently studied a water-absorbing agent having excellent absorbing properties and fluidity under a hygroscopic atmosphere. As a result, they found that the above problems were solved by using a specific compound as a crosslinking agent of the water-absorbent resin.

That is to say, a process for producing a water-absorbing agent, according to the present invention, is characterized by comprising the step of blending an oxetane compound and/or an imidazolidinone compound with a water-absorbent resin.

In addition, the present invention is characterized in that the oxetane compound is represented by the following structural formula (1) in the above production process for a water-absorbing agent, wherein the structural formula (1) is:

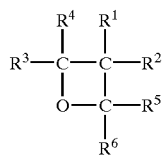

(1)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

In addition, the present invention is characterized in that the imidazolidinone compound is represented by the following structural formula (5) in the above production process for a water-absorbing agent, wherein the structural formula (5) is:

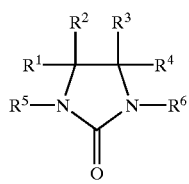

(5)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

An absorbing agent, according to the present invention, comprises: an oxetane compound and/or an imidazolidinone compound; and a water-absorbent resin.

In addition, an absorbing agent, according to the present invention, comprises a water-absorbent resin crosslinked with an oxetane compound and/or an imidazolidinone compound.

In addition, an absorbent article, according to the present invention, comprises the above-mentioned water-absorbing agent.

In addition, the present invention relates to a crosslinking agent for water-absorbent resins, which comprises an oxetane compound having at least one oxetane skeleton per a molecule.

In addition, the crosslinking agent for water-absorbent resins is characterized by having a structure represented by the following general formula (1), wherein the structural formula (1) is:

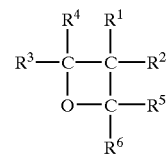

(1)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

In addition, the present invention relates to a crosslinking agent for water-absorbent resins, which comprises an imidazolidinone compound having at least one oxetane skeleton per a molecule.

In addition, the crosslinking agent for water-absorbent resins is characterized by having a structure represented by the following general formula (5), wherein the structural formula (5) is:

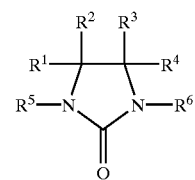

(5)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

These and other objects and the advantages of the present invention will be more fully apparent from the following detailed disclosure.

Figure 1:
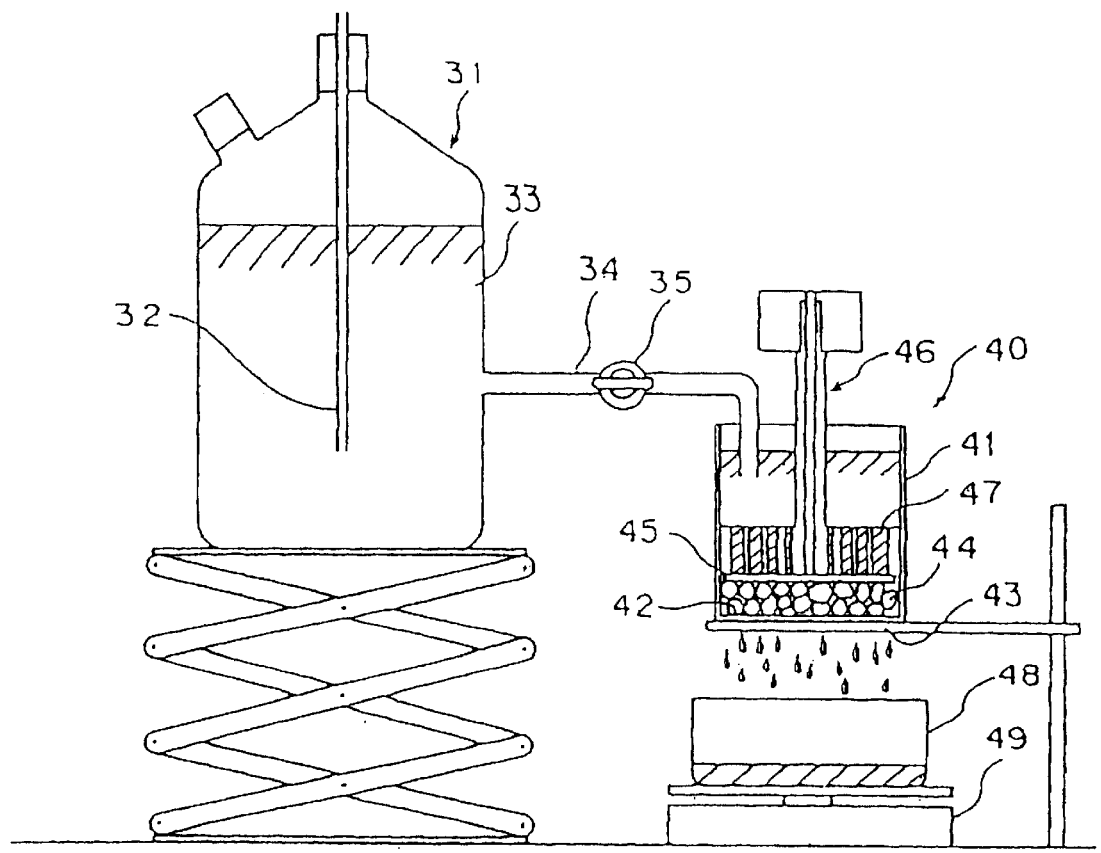
FIG. 1 is a schematic sectional view of a measurement apparatus for measuring saline flow conductivity.

(Explanation of the Symbols:)
31: Tank
32: Glass tube
33: Aqueous sodium chloride solution of 0.69 weight %
34: L-tube having cock
35: Cock
40: Vessel
41: Cell
42: Stainless wire net
43: Stainless wire net
44: Swollen gel
45: Glass filter
46: Piston
47: Opening in piston
48: Collecting vessel
49: Scale

DETAILED DESCRIPTION OF THE INVENTION

Hereinafter, the present invention is explained in detail.

The water-absorbent resin in the present invention is a water-swellable and water-insoluble crosslinked polymer, and conventional water-absorbent resins can be used. Examples thereof includes: conventional crosslinked polymers which can form an anionic, nonionic, or cationic hydrogel by absorbing as large a quantity of ion-exchange water as preferably 10 to 3,000 times, more preferably 50 to 1,000 times; or products obtained by drying the polymers, and usually pulverizing them before and/or after drying. Examples of the above water-absorbent resin include at least one selected from the group consisting of: partially-neutralized and crosslinked poly(acrylic acids); hydrolyzed copolymers of starch-acrylonitrile; neutralized graft polymers of starch-acrylic acid; saponified copolymers of vinyl acetate-acrylic acid ester; hydrolyzed copolymers of acrylonitrile or acrylamide, or crosslinked polymers of these hydrolyzed copolymers; modified products of crosslinked polyvinyl alcohols including carboxyl groups; and copolymers of crosslinked isobutylene-maleic anhydride. These water-absorbent resins can be used either alone respectively or in combinations with each other. However, among these, one kind of water-absorbent resins having a carboxyl group or mixture thereof is preferable. Typically, the water-absorbent resins comprise a polymer (water-swellable crosslinked poly(acrylic acid) or its salt), obtained by polymerizing and crosslinking monomers of which major component includes acrylic acid and/or its salt (neutralized product). In addition, as to the above-mentioned water-insoluble water-absorbent resins as used, the water-extractable content therein is preferably not more than 40 weight %, more preferably not more than 25 weight %, still more preferably not more than 20 weight %, yet still more preferably not more than 15 weight %, particularly preferably not more than 10 weight %.

Examples of the above acrylic acid salt include: acrylic acid salts of alkaline metals such as sodium, potassium, and lithium; and ammonium salts and amine salts of acrylic acid. The constituent units of the above water-absorbent resin preferably comprise acrylic acid of 0 to 50 mol % and its salt of 100 to 50 mol % (wherein the total of both is 100 mol %/o), more preferably 10 to 40 mol % and 90 to 60 mol % respectively (wherein the total of both is 100 mol %/). The neutralization of the water-absorbent resin to form the above-mentioned salt may be carried out in the monomer form before polymerization, or in the polymer form in the middle of polymerization or after polymerization, or these may be combined each other. When the neutralization is carried out in the polymer form, there are advantages in that the water-extractable content is decreased. However, the neutralization requires fairly much time. Therefore, the neutralization is preferably carried out in the monomer form before polymerization in view of production costs.

The monomer to obtain the water-absorbent resin as used in the present invention may include monomers other than the above-mentioned acrylic acid (salt) when the occasion demands. The monomers other than the above-mentioned acrylic acid (salt) are not especially limited, but examples thereof include: anionic unsaturated monomers, such as methacrylic acid, maleic acid, vinylsulfonic acid, styrenesulfonic acid, 2-(meth)acrylamido-2-methylpropanesulfonic acid, 2-(meth)acryloylethanesulfonic acid, and 2-(meth)acryloylpropanesulfonic acid, and their salts; nonionic unsaturated monomers containing hydrophilic groups, such as acrylamide, methacrylamide, N-ethyl(meth)acrylaamide, N-n-propyl(meth)acrylamide, N-isopropyl(meth)acrylamide, N,N-dimethyl(meth)acrylamide, 2-hydroxyethyl (meth)acrylate, 2-hydroxypropyl (meth)acrylate, methoxypolyethylene glycol (meth)acrylate, polyethylene glycol mono(meth)acrylate, vinylpyridine, N-vinylpyrrolidone, N-acryloylpiperidine, N-acryloylpyrrolidine, and N-vinylacetamide; and cationic unsaturated monomers such as N,N-dimethylaminoethyl (meth)acrylate, N,N-diethylaminoethyl (meth)acrylate, N,N-dimethylaminopropyl (meth)acrylate, N,N-dimethylaminopropyl (meth)acrylamide, and their quaternary salts. These monomers may be used either alone respectively or in combinations with each other.

When the monomers other than the acrylic acid (salt) are used in the present invention, the ratio of the monomers other than the acrylic acid (salt) is preferably not more than 30 mol %, more preferably not more than 10 mol %, of the total with the acrylic acid and its salt used as major components. When the monomers other than the acrylic acid (salt) are used in the above ratio, the absorption properties of the water-absorbent resin (water-absorbing agent) as finally obtained are improved further more, and the water-absorbent resin (water-absorbing agent) can be obtained still more economically.

When the above-mentioned monomer is polymerized to obtain the water-absorbent resin as used in the present invention, bulk polymerization or precipitation polymerization can be carried out. However, in consideration of the performance or the easiness of the polymerization control, it is preferable to carry out aqueous solution polymerization or reversed-phase suspension polymerization by using the above monomer in the form of its aqueous solution. Incidentally, when the monomer is used in the form of its aqueous solution, the concentration of the monomer in its aqueous solution (hereinafter referred to as "aqueous monomer solution") is not especially limited, but is preferably in the range of 10 to 70 weight %, more preferably 20 to 60 weight %. In addition, when the above aqueous solution polymerization is carried out, a solvent other than water may be jointly used if necessary, and the kind of the solvent as jointly used is not especially limited.

Examples of the aqueous solution polymerization method include: a method which involves polymerizing the aqueous monomer solution in a double-arm type kneader while the resultant hydrogel is pulverized; and a method which involves supplying the aqueous monomer solution into a predetermined vessel or onto a moving belt in order to carry out a polymerization, and pulverizing the resultant gel with a meat chopper.

When the above polymerization is initiated, the following polymerization initiators, for example, can be used: radical polymerization initiators, such as potassium persulfate, ammonium persulfate, sodium persulfate, t-butyl hydroperoxide, hydrogen peroxide, and 2,2'-azobis(2-amidinopropane) dihydrochloride; or photopolymerization initiators, such as 2-hydroxy-2-methyl-1-phenyl-propan-1-one.

Furthermore, a redox initiator is also available by using a reducing agent together to promote decomposition of the above polymerization initiator and combining both with each other. Examples of the above reducing agent include: (bi)sulfurous acid (or its salts) such as sodium sulfite and sodium hydrogen-sulfite; L-ascorbic acid (or its salts); reducible metals (or their salts) such as ferrous salts; and amines. However, the reducing agent is not especially limited thereto.

The amount of the above polymerization initiator as used is in the range of usually 0.001 to 2 mol %, preferably 0.01 to 0.1 mol %. In the case where the amount of the polymerization initiator is less than 0.001 mol %, there are disadvantages in that a large amount of monomers remain unreacted, so the amount of monomers remaining in the resultant polymer, increases. On the other hand, in the case where the amount of the polymerization initiator is more than 2 mol %, there might be disadvantages in that the water-extractable content in the polymer increases.

In addition, the polymerization reaction may be initiated by irradiating the reaction system with active energy rays, such as radiations, electron beam, and ultraviolet rays, or further by using the polymerization initiators together. Incidentally, the reaction temperature in the above polymerization reaction is not especially limited, but is preferably in the range of 15 to 130° C., more preferably 20 to 110° C. In addition, the reaction time is not especially limited either, and may fitly be set according to factors such as the respective kinds of the monomers and polymerization initiators, and the reaction temperature.

The above water-absorbent resin may be a self-crosslinked one obtained by using no crosslinking agent, but preferable ones are those which are copolymerized or reacted with an internal-crosslinking agent having two or more polymerizable unsaturated groups or two or more reactive groups per molecule.

Examples of the above internal-crosslinking agent include: N, N'-methylenebis(meth)acrylamide, (poly) ethylene glycol di(meth)acrylate, (poly)propylene glycol di(meth)acrylate, trimethylolpropane tri(meth)acrylate, glycerol tri(meth)acrylate, glycerol acrylate methacrylate, ethylene oxide-modified trimethylolpropane tri(meth) acrylate, pentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol -diglycidyl ether, ethylene glycol, polyethylene glycol, propylene glycol, glycerin, pentaerythritol, ethylenediamine, ethylene carbonate, propylene carbonate, polyethylenimine, and glycidyl (meth) acrylate. In addition, the following oxetane compound that is a crosslinking agent in the present invention may be used.

These internal-crosslinking agents may be used either alone or fitly in combinations of at least two thereof. In addition, these internal-crosslinking agents may be added to the reaction system either collectively or divisionally. When at least one internal-crosslinking agent is used, it is preferable to use a compound having at least two polymerizable unsaturated groups by all means while the polymerization in consideration of the absorption properties of the water-absorbent resin as finally obtained.

The amount of the internal-crosslinking agent as used, is preferably in the range of 0.005 to 2 mol %, more preferably 0.02 to 0.5 mol %, still more preferably 0.04 to 0.2 mol %/o, of the above-mentioned monomer. In the case where the amount of the above-mentioned internal-crosslinking agent as used is less than 0.005 mol % or more than 2 mol %, the sufficient absorption properties might not be obtained.

When the crosslinking structure is introduced into the internal portion of the polymer using the above internal-crosslinking agent, the internal-crosslinking agent may be added to the reaction system before, during, or after polymerization of the above-mentioned monomer, or after neutralization.

Incidentally, when the above-mentioned polymerizatiuon is carried out, the following materials may be added to the reaction system: various foaming agents, such as carbonates (or hydrogencarbonates), carbon dioxide, azo compounds, and inert organic solvents; hydrophilic polymers, such as starch, cellulose, their derivatives, polyvinyl alcohol, polyacrylic acid (or its salts), and crosslinked products of polyacrylic acid (or its salts); various surfactants; chelating agents; and chain-transfer agents, such as hypophosphorous acid (or its salts).

When the crosslinked polymer as obtained by the above aqueous solution polymerization reaction is a gel polymer, namely, a hydrogel crosslinked polymer, this polymer is dried if necessary, and usually pulverized before and/or after drying, thus obtaining the water-absorbent resin powder. In addition, the drying temperature is usually in the range of 60 to 250° C., preferably 100 to 220° C., more preferably 120 to 200° C., and the drying time is in the range of 10 minutes to 12 hours, preferably 20 minutes to 6 hours, more preferably 30 minutes to 3 hours.

The water content (defined by the amount as reduced by drying at 180° C. for 3 hours per 1 g of the water-absorbent resin) of the water-absorbent resin usable in the present invention, is not especially limited, but is preferably in the range of 0 to 400 weight %/o, more preferably 0.2 to 40 weight %, still more preferably 0.2 to 20 weight %, particularly preferably 0.2 to 10 weight %

In addition, examples of the form of the water-absorbent resin usable in the present invention include particle ones. As to the weight-average particle diameter (defined by dispersing with a sieve and determining a plotted value on logarithmic probability paper) of the water-absorbent resin, water-absorbent resins having an average particle diameter of larger than 1,000 μm in a form of gel can be used, wherein the water-absorbent resins are obtained by the polymerization reaction and has not been dried or pulverized yet. However, the water-absorbent resin usually comprises particles with an average particle diameter of 10 to 1,000 μm, preferably 50 to 800 μm, more preferably 75 to 700 μm (but not including 75 μm), particularly preferably 150 to 600 μm (but not including 150 μm). The water-absorbent resin more preferably comprises a smaller amount of particles that are particulate powders (for example, not larger than 100 μm). For example, the amount of the particulate powders is preferably not more than 10 weight %, more preferably not more than 5 weight %, particularly preferably 1 weight %. The particle shape of the water-absorbent resin as obtained in the above way is not limited to spherical, pulverized, or irregular shape, but those having the irregular pulverized shape, as obtained via the pulverization step, can preferably be used.

In the present invention, the water-absorbing agent comprises a water-absorbent resin in an amount of preferably not less than 80 weight %, more preferably not less than 90 weight %, and is obtained by modifying (preferably surface-modifying, particularly surface-crosslinking) a water-absorbent resin with a crosslinking agent.

Compounds having the following structure (1) can be used as the oxetane compound usable in the present invention.

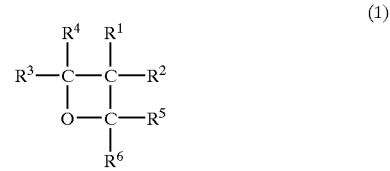

(1)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

$R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group. $R^1$ and $R^2$ are preferably a hydrogen atom, a hydroxyl group, an alkyl group, or a substituted alkyl group, more preferably a hydrogen atom, a hydroxyl group, an alkyl group having 1 to 6 carbon atoms, or a substituted alkyl group having a hydroxyl group and 1 to 6 carbon atoms. $R^3$ to $R^6$ each independently are preferably a hydrogen atom, a hydroxyl group, or an alkyl group, more preferably a hydrogen atom. In addition, the oxetane compound is may be insoluble in water, but is preferably water-soluble such that the solubility is preferably not less than 0.5 g, more preferably not less than 1 g, still more preferably 5 g, per 100 g of water at 25° C.

Examples thereof include: oxetane; compounds having an oxetane ring and a hydroxyl group, such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, and 3-butyl-3-oxetane ethanol; compounds having an oxetane ring and an amino group, such as 3-methyl-3-aminomethyloxetane, and 3-methyl-3-aminomethyloxetane; compounds having an halogen atom, such as 3-chloromethyl-3-methyloxetane, and 3-chloromethyl-3-ethyloxetane; and compounds having an aliphatic unsaturated group, such as 3-methyl-3-allyloxymethyloxetane, 3-ethyl-3-allyloxymethyloxetane, 3-methyl-3-methallyloxymethyloxetane, 3-ethyl-3-methallyloxymethyloxetane, 3-methyl-3-(2-propenyloxy) methyloxetane, 3-ethyl-3-(2-propenyloxy)methyloxetane, 3-methyl-3-(2-methyl-2-propenyloxy)methyloxetane, and 3-ethyl-3-(2-methyl-2-propenyloxy)methyloxetane; and compounds having an aromatic unsaturated group, such as 3-methyl-3-phenyloxymethyloxetane, 3-ethyl-3-phenyloxymethyloxetane, 3-methyl-3-bezyloxymethyl-oxetane, and 3-ethyl-3-benzyloxymethyloxetane. In addition, the above-mentioned oxetane compounds having a hydroxyl group, an amino group, or a halogen atom may be esterified, amidified, or etherified. Examples thereof include: esterified products between the oxetane compounds having a hydroxyl group and acids, such as glycolic acid, lactic acid, acetic acid, propionic acid, glutaric acid, succinic acid, tartaric acid, malonic acid, malic acid, citric acid, or poly (acrylic acid) (for example, a diesterified product between tartaric acid and 3-methyl-3-oxetane methanol); amidified products from compounds having an amino group; and etherified products between the oxetane compounds and compounds, such as methyl alcohol, ethyl alcohol, n-propyl alcohol, isopropyl alcohol, butyl alcohol, isobutyl alcohol, t-butyl alcohol, ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, glycerophosphoric acid, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, pentaerythritol, sorbitol, dibromomethane, dichloromethane, -diiodmethane, 1,1-dibromoethane, 1,2-dibromoethane, 1,2-dichloroethane, 1,2-diiodoethane, 1,2-dibromopropane, 1,2-dichloropropane, 1,3-dibromopropane, 1,3-dichloropropane, 1,3-diiodopropane, 1,2,3-tribromopropane, 1,2,3-trichloropropane, 2,2-dibromopropane, 1,3-dibromopropane, 1,3-dibromobutane, 1,4-dibromobutane, 1,4-dichlorobutane, 2,3-dichlorobutane, and benzyl bromide.

In addition, oxetane compounds having at least one oxetane skeleton can be used as the oxetane compound in the present invention.

Accordingly, the oxetane compound according to the present invention is not limited to a compound having one oxetane skeleton per a molecule, but may be a compound having a plurality of oxetane skeletons. The oxetane skeleton has a cyclic structure especially having an oxygen atom and a four-membered ether structure. Examples thereof include di-, tri-, tetra-, or poly-oxetane compounds (substances having high molecular weight) having at least one structure represented by the following general formula (2) or (3).

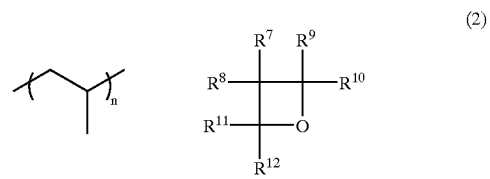
(2)

where: $R^7$ represents an oxygen atom, an alkyl group, an aromatic group, a substituted alkyl group, or a substituted aromatic group; $R^8$, $R^9$, $R^{10}$, $R^{11}$, and $R^{12}$ each independently represent a hydrogen atom, a hydroxyl group, an alkyl group, an alkenyl group, an aromatic group, a halogen group, a substituted alkyl group, a substituted alkenyl group, or a substituted aromatic group; and n represents an integer of not less than 1.

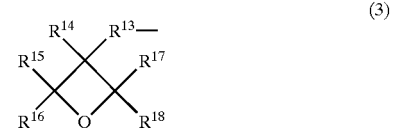
(3)

where: $R^{13}$ represents an oxygen atom, an alkyl group, an aromatic group, a substituted alkyl group, a substituted alkenyl group, or a substituted aromatic group; and $R^{14}$, $R^5$, $R^{16}$, $R^{17}$, and $R^{18}$ each independently represent a hydrogen atom, a hydroxyl group, an alkyl group, an alkenyl group, an aromatic group, a halogen group, a substituted alkyl group, a substituted alkenyl group, or a substituted aromatic group.

Examples of the polyocxetane compound having a plurality of the oxetane skeletons include compounds represented by the following general formula (4).

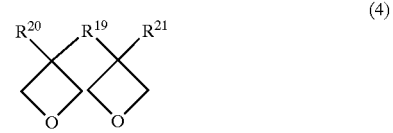
(4)

where: $R^{19}$ represents an oxygen atom, an alkyl group, an alkenyl group, an aromatic group, a halogen group, a substituted alkyl group, a substituted alkenyl group, or a substituted aromatic group; and $R^{20}$, and $R^{21}$ each independently represent a hydrogen atom, a hydroxyl group, an alkyl group, an alkenyl group, an aromatic group, a halogen group, a substituted alkyl group, a substituted alkenyl group, or a substituted aromatic group.

Compounds having the following structure (5) can be used as the imidazolidinone compound usable in the present invention.

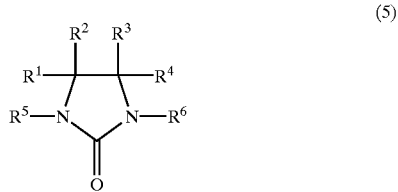

(5)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

$R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group, preferably a hydrogen atom, a hydroxyl group, an alkyl group, an aromatic group, a substituted alkyl group, or a substituted aromatic group, more preferably a hydrogen atom, a hydroxyl group, or a substituted alkyl group. In addition, the imidazolidinone compound is may be insoluble in water, but is preferably water-soluble such that the solubility is preferably not less than 0.5 g, more preferably not less than 1 g, still more preferably 5 g, per 100 g of water at 25° C.

Examples thereof include: 2-imidazolidinone, acetylene urea, dimethylol ethyleneurea, and dimethylol hydroxyethyleneurea.

In addition, imidazolidinone compounds having at least one imidazolidinone skeleton can be used as the imidazolidinone compound in the present invention.

Accordingly, the imidazolidinone compound according to the present invention is not limited to a compound having one imidazolidinone skeleton per a molecule, but may be a compound having a plurality of imidazolidinone skeletons.

The amount of the oxetane compound and/or the imidazolidinone compound as used in the present invention is preferably in the range of 0.005 to 10 parts by weight, more preferably 0.05 to 5 parts by weight, per 100 parts by weight of the water-absorbent resin in terms of solid content. The absorption properties for body fluids (aqueous liquids), such as urine, sweat, and blood can be improved further more due to using the oxetane compound and/or the imidazolidinone compound in the above range. In case where the amount of the oxetane compound and/or the imidazolidinone compound as used is less than 0.005 part by weight, the crosslinking density of the surface neighborhood of the water-absorbent resin cannot be enhanced at all, and the absorption properties might not be improved. In addition, in case where the amount of the oxetane compound and/or the imidazolidinone compound as used is more than 10 parts by weight, it is uneconomical because the oxetane compound and/or the imidazolidinone compound is in excess, and there is a possibility that the absorption capacity is not improved because the crosslinking density is difficult to control to a suitable value.

When the water-absorbent resin, and the oxetane compound and/or the imidazolidinone compound are blended in the present invention, water is further added thereto preferably. The water may be added at any time, for example, before, during or after adding the oxetane compound and/or the imidazolidinone compound. However, a method which involves blending the oxetane compound and/or the imidazolidinone compound, and the water at the same time is preferable because of easiness of the process, and a method which involves add-blending the oxetane compound and/or the imidazolidinone compound in a form of an aqueous dispersing liquid or an aqueous solution is more preferable. The amount of the water as used in the above is in the range of 0.5 to 10 parts by weight, preferably 0.5 to 3 parts by weight. In case where the amount of the water as used is more than 10 parts by weight, the absorption capacity may be decreased. In case where the amount of the water as used is less than 0.5 part by weight, there is a possibility that the absorption capacity under a load cannot be improved.

In addition, when the water-absorbent resin, and the oxetane compound and/or the imidazolidinone compound are blended in the present invention, hydrophilic organic solvents may be used together in addition to the water. Examples of the hydrophilic organic solvents include: lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane, methoxy(poly)ethylene glycol, and tetrahydrofuran; amides such as ε-caprolactam and N,N-dimethylformamide; sulfoxides such as dimethyl sulfoxide; and polyhydric alcohols such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymers, pentaerythritol, and sorbitol. The amount of the hydrophilic organic solvent as used is dependent upon the kind and particle diameter of the water-absorbent resin, but is usually in the range of 0 to 10 parts by weight, preferably 0 to 5 parts by weight, more preferably 0.1 to 5 parts by weight, per 100 parts by weight of the water-absorbent resin. When the polyhydric alcohol is used as the hydrophilic organic solvent, its portion or entirety may be allowed to react with the water-absorbent resin.

Furthermore, when the water-absorbent resin, and the oxetane compound and/or the imidazolidinone compound are blended in the present invention, surfactants or inactive inorganic fine particles may be used as a material other than the water and the hydrophilic organic solvent so as to improve the blendability or properties. Examples of the surfactants and inactive inorganic fine particles as used are disclosed in U.S. Pat. No. 5,164,459, EP 827753, EP 349240, and EP 761241.

In addition, inorganic or organic acids may be used so as to accelerate the reaction of the oxetane and/or the imidazolidinone compound, and to improve the absorption properties. Examples thereof include: sulfuric acid, phosphoric acid, hydrochloric acid, citric acid, glyoxylic acid, glycolic acid, glycerophosphoric acid, glutaric acid, cinnamic acid, succinic acid, acetic acid, tartaric acid, lactic acid, pyruvic acid, fumaric acid, propionic acid, 2-hydroxypropionic acid, malonic acid, butyric acid, isobutyric acid, iminodiacetic acid, malic acid, isethionic acid, citraconic acid, adipic acid, itaconic acid, crotonic acid, oxalic acid, salicylic acid, gallic acid, sorbic acid, gluconic acid, and p-toluenesulfonic acid. The amount of these acids as used varies due to pH of the water-absorbent resin, but is preferably in the range of 0 to 10 parts by weight, more preferably 0.1 to 5 parts by weight, per 100 parts by weight of the water-absorbent resin.

In the present invention, the blending of the water-absorbent resin, and the oxetane compound and/or the imidazolidinone compound may be carried out in a state such that the water-absorbent resin is dispersed in an organic solvent, such as cyclohexane and pentane. However, preferred examples thereof include a method which involves beforehand blending water and/or the hydrophilic organic solvent with the oxetane compound and/or the imidazolidinone compound if necessary, and spraying or drop-adding (preferably spraying) the resultant mixture to the water-absorbent resin. The size of the liquid drop as sprayed is preferably not larger than 300 μm, more preferably not larger than 200 μm. When water is used for blending, the inactive inorganic fine particles or the surfactants may exist together.

The preferred blending apparatus as used for the above blending is necessary to have strong blending power for the purpose of ensuring the uniform blending. Usable and preferred examples of the blending apparatus in the present invention include: cylinder type blenders, double-walls cone type blenders, high-speed agitation type blenders, V-character-shaped blenders, ribbon type blenders, screw type blenders, fluid type rotary disk blenders, air current type blenders, double-arm type kneaders, internal blenders, pulverization type blenders, rotary blenders, and screw type extruders.

In the production process for a water-absorbing agent according to the present invention, the oxetane compound and/or the imidazolidinone compound is blended with the water-absorbent resin.

In the production process for a water-absorbing agent according to the present invention, the oxetane compound and/or the imidazolidinone compound is preferably blended with the water-absorbent resin, and thereafter the heat treatment or the photo-irradiation treatment is carried out when the surface neighborhood of the water-absorbent resin powder is crosslinked.

When the heat treatment is carried out in the present invention, the treating time is preferably in the range of 1 to 180 minutes, more preferably 3 to 120 minutes, still more preferably 5 to 100 minutes, and the treating temperature is preferably in the range of 60 to 250° C., more preferably 100 to 210° C., still more preferably 120 to 200° C. In case where the heating temperature is lower than 60° C., not only the productivity is caused to decrease because it takes much time to carry out the heat treatment, but also the uniform crosslinking is not accomplished. Therefore, there is a possibility that excellent water-absorbing agents are not obtained. In addition, in case where the treating temperature is higher than 250° C., the resultant water-absorbent resin (water-absorbing agent) is damaged, and it may be difficult to obtain water-absorbent resins having excellent absorption capacity.

The heat treatment can be carried out with conventional dryers and furnaces. Examples of the above dryers include channel type blending dryers, rotary dryers, disk dryers, fluidized-bed dryers, air blow type dryers, and infrared dryers.

When the photo-irradiation treatment is carried out in the present invention, ultraviolet rays are preferably irradiated. In addition, photo-polymerization initiators can be used.

In the production process in the present invention, the oxetane compound and/or the imidazolidinone compound can be used as the surface-crosslinking agent of the water-absorbent resin.

When the oxetane compound and/or the imidazolidinone compound is used as the surface-crosslinking agent, conventional surface-crosslinking agents may be used together separately or simultaneously. Examples of the surface-crosslinking agent which can be used together are disclosed in JP-A-180233/1983, JP-A-16903/1986, JP-A-189103/1984, JP-A-117393/1977, JP-A-136588/1976, JP-A-257235/1986, JP-A-7745/1987, JP-A-211305/1986, JP-A-252212/1986, JP-A-264006/1986, DE 4020780, WO 99/42494, WO 99/43720, WO 00/31153, and JP-A-197818/2000.

The water-absorbing agent having the following absorption capacity can preferably be obtained due to carrying out the above surface-crosslinking. The absorption capacity under a load for a physiological saline solution of 0.9 weight % is not less than 20 g/g at 2.07 kPa (0.3 psi), preferably not less than 25 g/g, more preferably not less than 28 g/g, still more preferably not less than 30 g/g. Furthermore, the water-absorbing agent having the following fluidity can be obtained. The fluidity under a hygroscopic atmosphere is not less than 60 weight %, preferably not less than 70 weight %, still more preferably not less than 90 weight %, after being left for 20 minutes in a condition such that the temperature is 40° C. and the relative humidity is 75%.

Accordingly, as to the present invention absorbing agent having an absorption capacity under a load of at least 20 g/g, and a fluidity under a hygroscopic atmosphere of not less than 60 weight %, the losses are decreased in the production process for sanitary materials such as diapers, and the sanitary materials such as diapers, comprising the water-absorbing agent, display excellent absorption properties.

In the present invention, the particularly preferable water-absorbing agent for sanitary materials is a water-absorbing agent whose surface neighborhood is treated with the oxetane compound and/or the imidazolidinone compound, and which has an absorption capacity under a load of at least 20 g/g. From our experiments, it is found that the present invention water-absorbing agent having these properties displays particular properties as sanitary materials such as diapers.

The production process for a water-absorbing agent according to the above present invention, if necessary, may further comprise the step of giving various functions to the water-absorbent resin, for example, adding substances, such as deodorants, antimicrobial agents, perfumes, inorganic powders (for example, silicon dioxide and titanium dioxide), foaming agents, pigments, dyes, hydrophilic short fibers, plasticizers, adhesives, surfactants, manure, oxidizing agents, reducing agents, water, salts, chelating agents, fungicides, hydrophilic polymers (for example, polyethylene glycol and polyethyleneimine), hydrophobic polymers, (for example, paraffin), thermoplastic resins, (for example, polyethylene and polypropylene), and thermosetting resins (for example, polyester resins and urea resins).

In the water-absorbing agent according to the present invention, the amount of the oxetane compound is preferably in the range of 0.005 to 10 parts by weight, more preferably 0.05 to 5 parts by weight, still more preferably 0.1 to 3 parts by weight, per 100 parts by weight of the water-absorbent resin.

The water content or the average particle diameter of the water-absorbing agent according to the present invention is preferably in the range of the above water-absorbent resin. In addition, the amount of the fine powders in the absorbing agent is preferably in the range of the above water-absorbent resin. In addition, the absorbing agent according to the present invention may be changed to a sheet, but preferably has particle-shape of the above water-absorbent resin. Furthermore, the water-extractable content in the water-absorbing agent is preferably in the range of the above water-absorbent resin.

The present invention absorbing agent, according to the present invention, is characterized in that the absorption capacity under a load for a physiological saline solution of 0.9 weight is at least 20 g/g at 2.07 kPa (0.3 psi), and that the fluidity under a hygroscopic atmosphere is not less than 60% after being left for 20 minutes in a condition such that the temperature is 40° C., and the relative humidity is 75%, but is not limited due to the above production process.

Accordingly, the present invention water-absorbing agent or the water-absorbing agent obtained by the present invention production process has absorption properties such as excellent absorption capacity under a load, and good hygroscopic fluidity. The present invention water-absorbing agent, having excellent absorption capacity under a load or handling character, can be said to be a quite novel product.

Furthermore, the present invention provides: a crosslinking agent for water-absorbent resins comprising an oxetane compound having at least one oxetane skeleton per a molecule, or a crosslinking agent for water-absorbent resins having a structure represented by the following general formula (1).

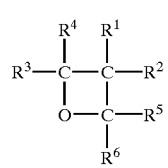

(1)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

In addition, the present invention also provides: a crosslinking agent for water-absorbent resins comprising an imidazolidinone compound having at least one oxetane skeleton per a molecule, or a crosslinking agent for water-absorbent resins having a structure represented by the following general formula (5).

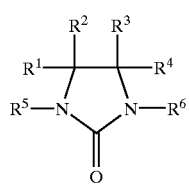

(5)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

The present invention crosslinking agent for water-absorbent resins, having the oxetane or imidazolidinone skeleton, can be applied in the beginning or middle of polymerizing the water-absorbent resin, at post-crosslinking after polymerization, or at crosslinking after drying, but is preferably used as the above surface-crosslinking agent. As is shown in the above, the oxetane compound or the imidazolidinone compound in the present invention is reactive, safe, and a crosslinking agent for water-absorbent resins, to give water-absorbing agents having excellent absorption capacity under a load and fluidity under a hygroscopic atmosphere.

The absorbent article, according to the present invention, is characterized by comprising the above water-absorbing agent according to the present invention. The present invention absorbent article has an absorbent layer comprising an absorbing material that absorbs body fluids.

The structure of the absorbing material is not especially limited if it is used for conventional absorbent articles. Examples thereof include: so-called sandwich structure such that the water-absorbing agent is placed between sheet-molded hydrophilic fiber materials; or so-called blend structure such that mixture of a hydrophilic fiber material and the water-absorbing agent is molded.

The weight ratio of the water-absorbing agent and the hydrophilic fiber material (water-absorbing agent: hydrophilic fiber material) in the above absorbing material is preferably (20 to 100): (80 to 0), usually (30 to 100): (70 to 0). These ratios can fitly be selected due to purpose of use.

The present invention absorbent article, for example, can be used by interposing between a surface sheet having liquid permeability and a back sheet having liquid impermeability. In addition, a diffusion layer may be put on the upper face of the absorbing material or on the back or upper face of the surface sheet, wherein the diffusion layer assists diffusing a liquid and comprises nonwoven fabrics, cellulose, or crosslinked cellulose. The above-mentioned liquid-permeable sheet comprises a material permeable with aqueous liquids. Examples thereof include: nonwoven fabrics, woven fabrics; porous synthetic resin films comprising polyethylene, polypropylene, polyester, or polyamide. The above-mentioned liquid-impermeable sheet comprises a material impermeable with aqueous liquids. Examples thereof include: synthetic resin films comprising polyethylene, polypropylene, ethylene vinyl acetate, or polyvinyl chloride; films of combined materials of these synthetic resins with nonwoven fabrics; films of combined materials comprising the above-mentioned synthetic resins with woven fabrics. Incidentally, the liquid-impermeable sheet may be permeable with vapor.

Examples of the absorbent article according to the present invention include: diapers or pads for children, adults, or persons suffering from incontinence; and blood-absorbent napkins for women. As to the structure of the above diapers and blood-absorbent napkins, various structures are employed in the same way as of the conventional structures. In addition, as to the materials of the surface sheet and the back sheet, conventional materials can be used without limiting especially.

Incidentally, deodorants, perfumes, various inorganic powders, foaming agents, pigments, dyes, hydrophilic short fibers, manure, oxidizing agents, reducing agents, chelating agents, water, and salts may further be added to the above absorbing material. Then, the various functions may be given to the absorbing material or absorbent article.

The absorbent article, according to the present invention, comprises the absorbing material produced by use of the above water-absorbing agent according to the present invention. Therefore, the effect of the absorbing agent according to the present invention, such as higher absorption capacity, can be caused. In addition, when producing absorbent articles, the effect, such that there is little problem caused by using highly hygroscopic water-absorbing agents, can be caused.

(Effects and Advantages of the Invention):

The present invention can provide: a process for producing a water-absorbing agent at low temperature in a short time, wherein the water-absorbing agent has excellent balance between the absorption capacity without load and the absorption capacity under a load, high fluidity under a hygroscopic atmosphere, and excellent safety. In addition,

DETAILED DESCRIPTION OF THE PREFERRED EMBODIMENTS

Hereinafter, the present invention is more specifically illustrated by the following examples of some preferred embodiments. However the present invention is not limited to these examples. Incidentally, various properties of the water-absorbing agent and the water-absorbent resin powder are measured in the following way.

(Absorption capacity without load:)

A nonwoven fabric bag (60 mm×60 mm), in which about 0.2 g of water-absorbent resin powder was put uniformly, and was immersed into a physiological saline solution of 0.9 wt %. After 60 minutes, the bag was drawn up and then drained at 250×9.81 cm/sec² (250 G) with a centrifuge for 3 minutes. Then, weight W1 (g) of the bag was measured. In addition, the same procedure as the above was carried out using no water-absorbent resin powder, and weight W0 (g) of the resultant bag was measured. Thus, the absorption capacity (g/g) without load was calculated from these weights W1 and W0 in accordance with the following equation. Incidentally, the measurement was carried out under a atmosphere of 20 to 25° C.

Absorption capacity (g/g) without load =(weight W1 (g)=weight W0 (g))/weight of water-absorbent resin powder (Absorption Capacity Under Load:)

First, 0.9 g of water-absorbing agent was uniformly spread on a stainless wire net of 400 mesh (mesh size: 38 μm) as attached by fusion to the bottom of a plastic supporting cylinder having an inner diameter of 60 mm, on which a piston and a load were further mounted in sequence, wherein the piston had an outer diameter only a little smaller than 60 mm and made no gap with the wall face of the supporting cylinder, but was not hindered from moving up and down, and the total weight of the piston and the load were adjusted to uniformly apply a load of 2.07 kPa or 4.83 kPa to the water-absorbing agent. Then, weight Wa (g) of the resultant set of measurement apparatus was measured.

A glass filter of 90 mm was mounted inside a Petri dish of 150 mm, and a physiological saline solution of 0.9 weight % was added up to the same level as the surface of the glass filter, on which a filter paper of diameter 90 mm was then mounted such that its entire surface would be wetted, and the excessive liquid was removed.

The above set of measurement apparatus was mounted on the above wet filter paper, thereby allowing the water-absorbing agent to absorb the liquid under a load. After 1 hour, the set of measurement apparatus was lifted, and its weight (Wb) is measured. The absorption capacity (g/g) under a load was calculated from the weights Wa and Wb in accordance with the following equation. Incidentally, the measurement was carried out under a atmosphere of 20 to 25° C.

Absorption capacity (g/g) under load=(weight Wb (g)–weight Wa (g))/weight of water-absorbing agent (0.9 (g)).

(Fluidity Under Hygroscopic Atmosphere:)

First, 2.0 g of water-absorbing agent or water-absorbent resin powder (having a particle diameter of not more than 850 μm) was uniformly spread on the bottom of an aluminum-made cup having a diameter of 52 mm and a height of 22 mm. The cup was quickly put into a temperature-humidity regulator (PLATINOUS LUCIFER PL-2G, made by TABAI ESPEC CORP.), in which the temperature and the relative humidity were beforehand adjusted to 40° C. and 75% respectively, and was left for 20 minutes. Then, the weight (WA) of the wet water-absorbent resin was measured. Furthermore, the wet water-absorbent resin was moved onto a JIS standard sieve having a diameter of 7.5 cm and a mesh opening of 1,000 μm, and the sieve was tapped for some times to give vibration. The weight (WB) of the water-absorbent resin passed through the sieve having a mesh opening of 1,000 μm was measured. The fluidity (%/) under a hygroscopic atmosphere was determined by calculating the following equation: WA/WB×100. The easily the water-absorbent resin is passed through the sieve even after wetting, namely, the higher the fluidity under a hygroscopic atmosphere is, the more excellent hygroscopic fluidity the water-absorbent resin preferably has.

(Weight-average Particle Diameter:)

The water-absorbent resin after pulverization was classified with JIS standard sieves having mesh openings of 850 μm, 600 μm, 500 μm, 425 μm, 300 μm, 212 μm, 150 μm, 106 μm, and 75 μm, and then the residual percentage R was plotted on logarithmic probability paper to determine the weight-average particle diameter (D50).

(Extractable Content:)

First, 0.5 g of water-absorbent resin was dispersed in 1,000 ml of deionized water, and then stirred for 16 hours. Thereafter, the resultant swollen gel was separated by filtration with a paper filter. The amount of water-soluble polymer in the resultant filtrate, namely, the extractable content (weight %, relative to the water-absorbent resin) eluting from the water-absorbent resin powder was measured by colloidal titration.

(Saline Flow Conductivity Test (refer to JP-A-509591/1997) :)

The test was carried out according to the saline flow conductivity (SFC) test disclosed in JP-A-509591/1997.

A measurement apparatus shown in FIG. 1 is used, and 0.900 g of water-absorbent resin as uniformly placed in a vessel 40 is swollen with artificial urine (1) under a load of 0.3 psi (2.07 kPa) for 60 minutes, and then the height of the gel layer of gel 44 is recorded. Next, an aqueous sodium chloride solution 33 of 0.69 weight % is permeated from a tank 31 having a constant stationary water pressure into the swollen gel layer under a load of 0.3 psi (2.07 kPa). This saline flow conductivity test is carried out at room temperature (20 to 25° C.). The liquid amount permeated into the gel layer for 20 seconds as time function is recorded for 10 minutes with a computer and a scale. The flow rate $F_s(t)$ when the solution passes through the swollen gel 44 (mainly, between particles) is determined by dividing the weight as increased (g) by the time as increased (s) in terms of the unit g/s. The time, when a constant water stationary water pressure and a stable flow rate are obtained, is regarded as $t_s$, and only the data obtained between $t_s$ and ($t_s$+10 minutes) are used for flow rate calculation. Then, the value $F_s(t=0)$ determined by the flow rate between $t_s$ and ($t_s$+10 minutes), namely, the flow rate when the solution passes through the gel layer first, is calculated. $F_s(t=0)$ is calculated by extrapolating the results of $F_s(t)$ vs. t by least-squares method into t=0.

$$\text{Saline flow conductivity} = (F_s(t=0) \times L_0)/(\rho \times A \times \Delta P)$$

$$= (F_s(t=0) \times L_0)/139{,}506$$

wherein:

$F_s(t=0)$: Flow rate in terms of g/s;

$L_0$: Height in terms of cm;

$\rho$: Density of aqueous sodium chloride solution (1.003 g/cm$^2$);

A: Area of upper gel layer in cell 41 (28.27 cm$^2$);

$\Delta P$: Stationary water pressure on gel layer (4,920 dyne/cm$^2$); and

Unit of SFC value: cm$^3 \times$s$\times$g$^{-1}$.

In the measurement apparatus shown in FIG. 1, a glass tube 32 was inserted to the tank 31, and the lower end of the glass tube 32 was placed so that the aqueous sodium chloride solution 33 of 0.69 weight % would be kept higher by 5 cm than the bottom of the swollen gel 44 in the cell 41. The aqueous sodium chloride solution 33 of 0.69 weight % was supplied into the cell 41 through a L-tube having a cock. A vessel collecting the passed liquid was placed under the cell 41, and the collecting vessel 48 was placed on a scale 49. The internal diameter of the cell 41 was 6 cm, and a stainless wire net (No. 400, and a mesh opening size of 38 µm) was placed at the bottom of the lower portion of the cell. The lower portion of a piston 46 had openings 47 enough so that the liquid would pass through, and a permeable glass filter 45 was attached at the bottom so that the water-absobing agent or its swollen gel would not enter the openings 47. The cell 41 was placed on a stand for putting the cell, and the surface of the stand in contact with the cell was placed on a stainless wire net 43 not hindered from permeating the liquid.

The following mixture was used as the artificial urine (1). The mixture was obtained by adding: 0.25 g of calcium chloride dihydrate, 2.0 g of potassium chloride, 0.50 g of magnesium chloride 6 hydrate, 2.0 g of sodium sulfate, 0.85 g of ammonium dihydrogen phosphate, 0.15 g of diammonium hydrogen phosphate, and 994.25 g of pure water.

REFERENTIAL EXAMPLE 1

In a reactor formed by attaching a cover to a double-arm type stainless kneader equipped with two sigma type blades and a jacket in a capacity of 10 liters, a reaction liquid was obtained by dissolving 3.70 g of polyethylene glycol diacrylate (n=9) into 5,500 g of aqueous acrylic acid salt monomer solution having a monomer concentration of 38 weight % and a neutralization ratio of 75 mol %. Next, this reaction liquid was degassed for 30 minutes in an atmosphere of nitrogen gas. Continuously, 2.7 g of ammonium persulfate and 0.02 g of L-ascorbic acid were added to the reaction liquid while being stirred, and then the reaction started after about 1 minute. Then, the polymerization was carried out at 20 to 90° C. while the resultant hydrogel polymer was pulverized. When 30 minutes passed from the beginning of the polymerization, a hydrogel crosslinked polymer (1) was taken out.

The hydrogel crosslinked polymer (1) as obtained was pulverized in a particle diameter of not larger than 5 mm. This pulverized hydrogel crosslinked polymer (1) was spread on a wire mesh of 50 mesh (mesh opening of 300 µm), and then hot-dried at 150° C. for 90 minutes. Then, the polymer was pulverized with a roller mill, and then classified with JIS vibration sieves having mesh openings of 850 µm and 106 µm, thus obtaining a water-absorbent resin (A).

The extractable content, the water content, and the weight-average particle diameter (D50) of the water-absorbent resin (A) were 23 weight %, 5 weight %/o, and 330 µm, respectively.

EXAMPLE 1

A surface-treating agent, comprising a mixed liquid of: 1.0 g of 3-methyl-3-oxetane methanol, 3.0 g of deionized water, and 3.0 g of isopropyl alcohol, was drop-blended with 100 g of the water-absorbent resin (A) as obtained in Referential Example 1. Thereafter, the resultant reaction mixture was left in a hot-blow dryer of 170° C. for 1 hour, thus obtaining a water-absorbing agent (1). The absorption capacity without load, the absorption capacity under a load of 2.07 kPa, and the fluidity under a hygroscopic atmosphere of the water-absorbing agent (1) as obtained were measured (hereinafter, in the same way), and the results were listed in Table 1.

EXAMPLE 2

A surface-treating agent, comprising a mixed liquid of-1.16 g of 3-ethyl-3-oxetane methanol, 6.0 g of water, and 3.0 g of isopropyl alcohol, was drop-blended with 100 g of the water-absorbent resin (A) as obtained in Referential Example 1. Thereafter, the resultant reaction mixture was left in a hot-blow dryer of 170° C. for 1 hour, thus obtaining a water-absorbing agent (2). The properties of the water-absorbing agent (2) as measured were listed in Table 1.

EXAMPLE 3

A surface-treating agent, comprising a mixed liquid of: 0.26 g of 3-methyl-3-oxetane methanol, 3.0 g of water, and 3.0 g of isopropyl alcohol, was drop-blended with 100 g of the water-absorbent resin (A) as obtained in Referential Example 1. Thereafter, the resultant reaction mixture was left in a hot-blow dryer of 165° C. for 1 hour, thus obtaining a water-absorbing agent (3). The properties of the water-absorbing agent (3) as measured were listed in Table 1.

COMPARATIVE EXAMPLE 1

The water-absorbent resin (A) as obtained in Referential Example 1 was used as a comparative absorbing agent (1), and its properties as measured were listed in Table 1.

COMPARATIVE EXAMPLE 2

A surface-treating agent, comprising a mixed liquid of: 1.0 g of ethylene carbonate, 3.0 g of deionized water, and 3.0 g of isopropyl alcohol, was drop-blended with 100 g of the water-absorbent resin (A) as obtained in Referential Example 1. Thereafter, the resultant reaction mixture was left in a hot-blow dryer of 170° C. for 1.5 hours, thus obtaining a comparative water-absorbing agent (2). The properties of the comparative water-absorbing agent (2) as measured, were listed in Table 1.

COMPARATIVE EXAMPLE 3

A surface-treating agent, comprising a mixed liquid of: 0.03 g of ethylene glycol diglycidyl ether, 1.0 g of propylene glycol, 3.0 g of deionized water, and 1.0 g of isopropyl alcohol, was drop-blended with 100 g of the water-absorbent resin (A) as obtained in Referential Example 1. Thereafter, the resultant reaction mixture was left in a hot-blow dryer of 170° C. for 1.0 hour, thus obtaining a comparative water-absorbing agent (3). The properties of the comparative water-absorbing agent (3) as measured were listed in Table 1.

COMPARATIVE EXAMPLE 4

A surface-treating agent, comprising a mixed liquid of: 0.3 g of 1,4-butanediol, 0.5 g of propylene glycol, 3.0 g of deionized water, and 0.5 g of isopropyl alcohol, was drop-blended with 100 g of the water-absorbent resin (A) as obtained in Referential Example 1. Thereafter, the resultant reaction mixture was left in a hot-blow dryer of 170° C. for 1.5 hours, thus obtaining a comparative water-absorbing agent (4). The properties of the comparative-water-absorbing agent (4) as measured were listed in Table 1.

COMPARATIVE EXAMPLE 5

A surface-treating agent, comprising a mixed liquid of: 1.20 g of trimethylolethane (the same molar amount of 3-methyl-3-oxetane methanol in Example 1), 3.0 g of water, and 3.0 g of isopropyl alcohol, was drop-blended with 100 g of the water-absorbent resin (A) as obtained in Referential Example 1. Thereafter, the resultant reaction mixture was left in a hot-blow dryer of 170° C. for 1.5 hours, thus obtaining a comparative water-absorbing agent (5). The properties of the comparative water-absorbing agent (5) as measured were listed in Table 1.

COMPARATIVE EXAMPLE 6

A surface-treating agent, comprising a mixed liquid of: 1.34 g of trimethylolpropane (the same molar amount of 3-methyl-3-oxetane methanol in Example 1), 3.0 g of water, and 3.0 g of isopropyl alcohol, was drop-blended with 100 g of the water-absorbent resin (A) as obtained in Referential Example 1. Thereafter, the resultant reaction mixture was left in a hot-blow dryer of 170° C. for 1.5 hours, thus obtaining a comparative water-absorbing agent (6). The properties of the comparative water-absorbing agent (6) as measured were listed in Table 1.

In addition, in comparison with the comparative water-absorbing agents (2), (4), (5), and (6) described in Comparative Examples 2, 4, 5, and 6, the water-absorbing agents (1) to (3) described in Examples 1 to 3 have the same absorption capacity without load and absorption capacity under a load, its reaction time is short, and further, the water-absorbing agents have more excellent fluidity under a hygroscopic atmosphere.

In addition, in comparison with the comparative water-absorbing agent (3) described in Comparative Example 3, the water-absorbing agents (1) to (3) described in Examples 1 to 3 have the same absorption capacity without load and absorption capacity under a load, but has more excellent fluidity under a hygroscopic atmosphere.

In this way, the absorbing agent, according to the present invention, has excellent balance between the absorption capacity without load and the absorption capacity under a load, and further, excellent fluidity under a hygroscopic atmosphere (handling under a condition of high temperature and humidity), and good properties such that the reaction time is shortened.

REFERENTIAL EXAMPLE 2

In a reactor formed by attaching a cover to a double-arm type stainless kneader equipped with two sigma type blades and a jacket in a capacity of 10 liters, a reaction liquid was obtained by dissolving 5.01 g of polyethylene glycol diacrylate (n=9) into 5,500 g of aqueous acrylic acid salt monomer solution having a monomer concentration of 41 weight %, a neutralization ratio of 71 mol %, and an average molecular weight of 87.7. Next, this reaction liquid was degassed for 30 minutes in an atmosphere of nitrogen gas. Continuously, 30.8 g of aqueous ammonium persulfate solution of 10 weight % and 2.57 g of aqueous L-ascorbic acid solution of 1 weight % were added to the reaction liquid

TABLE 1

| | | Water-absorbing agent | Heating Temperature (° C.) | Heating Time (hr) | Absorption capacity without load (g/g) | Absorption capacity under a load of 2.07 kPa (g/g) | Fluidity under a hygroscopic atmosphere (%) |
|---|---|---|---|---|---|---|---|
| Example | 1 | Water-absorbing agent (1) | 170 | 1.0 | 40 | 36 | 92 |
| | 2 | Water-absorbing agent (2) | 170 | 1.0 | 41 | 35 | 89 |
| | 3 | Water-absorbing agent (3) | 165 | 1.0 | 42 | 34 | 91 |
| Comparative Example | 1 | Comparative water-absorbing agent (1) | 170 | 1.5 | 48 | 8 | 0 |
| | 2 | Comparative water-absorbing agent (2) | 170 | 1.5 | 40 | 35 | 21 |
| | 3 | Comparative water-absorbing agent (3) | 170 | 1.0 | 40 | 37 | 55 |
| | 4 | Comparative water-absorbing agent (4) | 170 | 1.5 | 40 | 36 | 4 |
| | 5 | Comparative water-absorbing agent (5) | 170 | 1.5 | 40 | 36 | 14 |
| | 6 | Comparative water-absorbing agent (6) | 170 | 1.5 | 45 | 27 | 13 |

In comparison with the comparative water-absorbing agent (1) described in Comparative Example 1 and not surface-treated with surface-treating agents, the water-absorbing agents (1) to (3) described in Examples 1 to 3 have larger absorption capacity under a load, more excellent balance between the absorption capacity without load and the absorption capacity under a load, and further, more excellent fluidity under a hygroscopic atmosphere.

while being stirred, and then the reaction started after about 1 minute. Then, the polymerization was carried out at 20 to 95° C. while the resultant hydrogel polymer was pulverized. When 30 minutes passed from the beginning of the polymerization, a hydrogel crosslinked polymer (2) was taken out.

The hydrogel crosslinked polymer (2) as obtained was pulverized in a particle diameter of not larger than 5 mm. This pulverized hydrogel crosslinked polymer (2) was spread on a wire mesh of 50 mesh (mesh opening of 300 em), and then hot-dried at 180° C. for 50 minutes. Then, the polymer was pulverized with a roller mill, and then classified with JIS vibration sieve having a mesh opening of 850 μm, thus obtaining a water-absorbent resin (B).

The absorption capacity without load, the extractable content, and the weight-average particle diameter (D50) of the water-absorbent resin (D) were 39 (g/g), 13 weight %, and 450 μm, respectively.

EXAMPLE 4

A surface-treating agent, comprising a mixed liquid of: 0.26 g of 3-methyl-3-oxetane methanol, 0.384 g of 1,4-butanediol, 0.6 g of propylene glycol, and 3.39 g of water, was drop-blended with 100 g of the water-absorbent resin (B) as obtained in Referential Example 2. Thereafter, the resultant reaction mixture was left in a hot-blow dryer of 212° C. for 25 minutes, thus obtaining a water-absorbing agent (4). The resultant water-absorbing agent (4) was in a form of powder. The absorption capacity without load, the absorption capacity under a load of 4.83 kPa, the saline flow conductivity, and the fluidity under a hygroscopic atmosphere thereof were measured (hereinafter, in the same way), and the results were listed in Table 2.

COMPARATIVE EXAMPLE 7

A surface-treating agent, comprising a mixed liquid of: 0.26 g of 0.384 g of 1,4-butanediol, 0.6 g of propylene glycol, and 3.39 g of water, was drop-blended with 100 g of the water-absorbent resin (3) as obtained in Referential Example 2. Thereafter, the resultant reaction mixture was left in a hot-blow dryer of 212° C. for 35 minutes, thus obtaining a comparative water-absorbing agent (7). The resultant comparative water-absorbing agent (7) was in a form of powder. The properties thereof as measured were listed in Table 2.

EXAMPLE 5

A water-absorbing agent (5) was obtained by blending 1.0 g of 3-methyl-3-oxetane methanol with 100 g of the comparative water-absorbing agent (7) as obtained in Comparative Example 7. The properties of the water-absorbing agent (5) as measured were listed in Table 2.

A water-absorbing agent (6) was obtained by blending 1.0 g of di[1-ethyl(3-oxetanyl)] methyl ether with 100 g of the comparative water-absorbing agent (7) as obtained in Comparative Example 7. The properties of the water-absorbing agent (6) as measured were listed in Table 2.

described in Comparative Example 7. In comparison with the comparative water-absorbing agent (7), the water-absorbing agent (4) has the same absorption capacity without load, but its heating time is shorter. In addition, the water-absorbing agent (4) has higher saline flow conductivity value, and further, more excellent fluidity under a hygroscopic atmosphere.

In addition, the water-absorbing agents (5) and (6) are obtained by add-blending the oxetane compound with the comparative water-absorbing agent (7) described in Comparative Example 7. In comparison with the comparative water-absorbing agent (7), the fluidity under a hygroscopic atmosphere of the water-absorbing agents (5) and (6) is improved without decreasing the absorption capacity without load, the absorption capacity under a load, and the saline flow conductivity.

In this way, the absorbing agent obtained by the present invention production process, has excellent between the absorption capacity without load and the absorption capacity under a load, and further, excellent fluidity under a hygroscopic atmosphere, and good properties such that the reaction time is shortened.

In addition, the water-absorbing agent comprising the oxetane compound and the water-absorbent resin, according to the present invention, is excellent because the absorption capacity without load, the absorption capacity under a load, and the saline flow conductivity, which the water-absorbent resin naturally has, are not damaged, and the fluidity under a hygroscopic atmosphere can be enhanced.

EXAMPLE 7

A surface-treating agent, comprising a mixed liquid of: 0.86 g of 2-imidazolidinone, 3.0 g of water, and 3.0 g of isopropyl alcohol, and, was drop-blended with 100 g of the water-absorbent resin (A) as obtained in Referential Example 1. Thereafter, the resultant reaction mixture was left in a hot-blow dryer of 170° C. for 1.5 hours, thus obtaining a water-absorbing agent (7). The absorption capacity without load and the absorption capacity under a load of 2.07 kPa of the resultant water-absorbing agent (7) were measured, and the results were listed in Table 3.

COMPARATIVE EXAMPLE 8

A surface-treating agent, comprising a mixed liquid of: 0.60 g of urea (the same molar amount of 2-imidazolidinone in Example 7), 3.0 g of water, and 3.0 g of isopropyl alcohol, and, was drop-blended with 100 g of the water-absorbent resin (A) as obtained in Referential Example 1. Thereafter,

TABLE 2

| | | Water-absorbing agent | Heating Temperature (° C.) | Heating Time (hr) | Absorption capacity without load (g/g) | Absorption capacity under a load of 4.83 kPa (g/g) | Saline flow conductivity (10e7k) | Fluidity under a hygroscopic atmosphere (%) |
|---|---|---|---|---|---|---|---|---|
| Example | 4 | Water-absorbing agent (4) | 212 | 25 | 31 | 26 | 41 | 98 |
| | 5 | Water-absorbing agent (5) | — | — | 30 | 24 | 36 | 99 |
| | 6 | Water-absorbing agent (6) | — | — | 30 | 24 | 36 | 94 |
| Comparative Example | 7 | Comparative water-absorbing agent (7) | 212 | 35 | 30 | 24 | 36 | 57 |

The water-absorbing agent (4) is obtained by using the oxetane compound together with the surface-treating agent used for the comparative water-absorbing agent (7)

the resultant reaction mixture was left in a hot-blow dryer of 170° C. for 1.5 hours, thus obtaining a comparative water-absorbing agent (8). The absorption capacity without load and the absorption capacity under a load of 2.07 kPa of the resultant comparative water-absorbing agent (8) were measured, and the results were listed in Table 3.

TABLE 3

| | Water-absorbing agent | Heating Temperature (° C.) | Time (hr) | Absorption capacity without load (g/g) | Absorption capacity under a load of 2.07 kPa (g/g) |
|---|---|---|---|---|---|
| Example 7 | Water-absorbing agent (7) | 170 | 1.5 | 41 | 33 |
| Comparative Example 1 | Comparative water-absorbing agent (1) | 170 | 1.5 | 48 | 8 |
| 8 | Comparative water-absorbing agent (8) | 170 | 1.5 | 47 | 8 |

In comparison with the comparative water-absorbing agent (1) described in Comparative Example 1 and not surface-treated with surface-treating agents, the water-absorbing agent (7) described in Example 7 has larger absorption capacity under a load, more excellent balance between the absorption capacity without load and the absorption capacity under a load.

In addition, in comparison with the comparative water-absorbing agent (8) described in Comparative Example 8, the water-absorbing agent (7) described in Example 7 has larger absorption capacity under a load, more excellent balance between the absorption capacity without load and the absorption capacity under a load.

In this way, the absorbing agent, according to the present invention, has excellent balance between the absorption capacity without load and the absorption capacity under a load, and good properties.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for producing a water-absorbing agent, which is characterized by comprising the step of blending an oxetane compound and/or an imidazolidinone compound with a water-absorbent resin, where said water-absorbent resin is selected from the group consisting of crosslinked poly(acrylic acids) and partially or entirely neutralized product thereof; hydrolyzed copolymers of starch-acrylonitrile, neutralized graft polymers of starch-acrylic acid, saponified copolymers of vinyl acetate-acrylic acid ester, hydrolyzed copolymers of acrylonitrile or acrylamide, crosslinked polymers of hydrolyzed copolymers of acrylonitrile or acrylamide, crosslinked polyvinyl alcohols having a carboxyl group, and copolymers of crosslinked isobutylene-maleic anhydride.

2. A process for producing a water-absorbing agent according to claim 1, wherein the oxetane compound is represented by the following structural formula (1), wherein the structural formula (1) is:

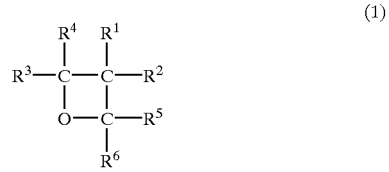

(1)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

3. A process for producing a water-absorbing agent according to claim 1, wherein the imidazolidinone compound is represented by the following structural formula (5), wherein the structural formula (5) is:

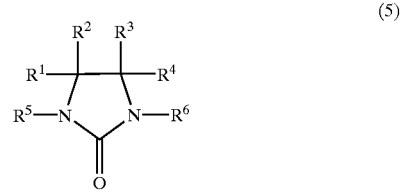

(5)

where: $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

4. A process for producing a water-absorbing agent according to claim 1, which is characterized by comprising the steps of
blending the oxetane compound and/or the imidazolidinone compound with the water-absorbent resin; and
heating the resultant mixture.

5. A process for producing a water-absorbing agent according to claim 2, which is characterized by comprising the steps of:
blending the oxetane compound and/or the imidazolidinone compound with the water-absorbent resin; and
heating the resultant mixture.

6. A process for producing a water-absorbing agent according to claim 3, which is characterized by comprising the steps of:

blending the oxetane compound and/or the imidazolidinone compound with the water-absorbent resin; and heating the resultant mixture.

7. A process for producing a water-absorbing agent according to claim 1, which is characterized in that the water-absorbent resin is obtained after drying.

8. A process for producing a water-absorbing agent according to claim 2, which is characterized in that the water-absorbent resin is obtained after drying.

9. A process for producing a water-absorbing agent according to claim 3, which is characterized in that the water-absorbent resin is obtained after drying.

10. A process for producing a water-absorbing agent according to claim 4, which is characterized in that the water-absorbent resin is obtained after drying.

11. A process for producing a water-absorbing agent according to claim 5, which is characterized in that the water-absorbent resin is obtained after drying.

12. A process for producing a water-absorbing agent according to claim 6, which is characterized in that the water-absorbent resin is obtained after drying.

13. An absorbing agent, which comprises: an oxetane compound and/or an imidazolidinone compound; and a water-absorbent resin, where said water-absorbent resin is selected from the group consisting of crosslinked poly(acrylic acids) and partially or entirely neutralized product thereof, hydrolyzed copolymers of starch-acrylonitrile, neutralized graft polymers of starch-acrylic acid, saponified copolymers of vinyl acetate-acrylic acid ester, hydrolyzed copolymers of acrylonitrile or acrylamide, crosslinked polymers of hydrolyzed copolymers of acrylonitrile or acrylamide, crosslinked polyvinyl alcohols having a carboxyl group, and copolymers of crosslinked isobutylene-maleic anhydride.

14. An absorbing agent, which comprises a water-absorbent resin crosslinked with an oxetane compound and/or an imidazolidinone compound, where said water-absorbent resin is selected from the group consisting of crosslinked poly(acrylic acids) and partially or entirely neutralized product thereof, hydrolyzed copolymers of starch-acrylonitrile, neutralized graft polymers of starch-acrylic acid, saponified copolymers of vinyl acetate-acrylic acid ester, hydrolyzed copolymers of acrylonitrile or acrylamide, crosslinked polymers of hydrolyzed copolymers of acrylonitrile or acrylamide, crosslinked polyvinyl alcohols having a carboxyl group, and copolymers of crosslinked isobutylene-maleic anhydride.

15. An absorbing agent according to claim 14, wherein the surface neighborhood of the water-absorbent resin is treated with the oxetane compound and/or the imidazolidinone compound, and the absorption capacity under a load for a physiological saline solution of 0.9 weight % is at least 20 g/g at 2.07 kPa.

16. An absorbing agent according to claim 14, which is characterized in that the fluidity under a hygroscopic atmosphere is not less than 60% after being left for 20 minutes in a condition such that the temperature is 40° C. and the relative humidity is 75%.

17. An absorbing agent according to claim 15, which is characterized in that the fluidity under a hygroscopic atmosphere is not less than 60% after being left for 20 minutes in a condition such that the temperature is 40° C. and the relative humidity is 75%.

18. An absorbent article, which comprises the water-absorbing agent as recited in claim 14.

19. An absorbent article, which comprises the water-absorbing agent as recited in claim 15.

20. An absorbent article, which comprises the water-absorbing agent as recited in claim 16.

21. An absorbent article, which comprises the water-absorbing agent as recited in claim 17.

22. A process for producing a water-absorbing agent according to claim 1, wherein said water-absorbent resin is a water-swellable crosslinked poly(acrylic acid) or salt thereof.

23. A process for producing a water-absorbing agent according to claim 1, wherein said water-absorbent resin is a polymer obtained by polymerizing and crosslinking monomers comprising acrylic acid, acrylic acid salt or mixture thereof as a major component.

24. A process for producing a water-absorbing agent comprising:

crosslinking a water-absorbent resin with a crosslinking agent, said crosslinking agent comprising at least one compound selected from the group consisting of an oxetane compound having at least one oxetane skeleton per molecule, an imidazolidinone compound having at least one imidazolidinone skeleton per molecule, and mixtures thereof, where said water-absorbent resin is selected from the group consisting of crosslinked poly(acrylic acids) and partially or entirely neutralized product thereof, hydrolyzed copolymers of starch-acrylonitrile, neutralized graft polymers of starch-acrylic acid, saponified copolymers of vinyl acetate-acrylic acid ester, hydrolyzed copolymers of acrylonitrile or acrylamide, crosslinked polymers of hydrolyzed copolymers of acrylonitrile or acrylamide, crosslinked polyvinyl alcohols having a carboxyl group, and copolymers of crosslinked isobutylene-maleic anhydride.

25. A process for producing a water-absorbing agent according to claim 24, wherein said water-absorbent resin is a polyacrylic acid or salt thereof.

26. A process for producing a water-absorbing agent according to claim 24, wherein said water-absorbent resin is a polymer obtained by polymerizing and crosslinking monomers comprising acrylic acid, acrylic acid salts, or mixtures thereof as a major component.

27. A process for producing a water-absorbing agent according to claim 24, comprising surface crosslinking said resin with said crosslinking agent.

28. A process for producing a water-absorbing agent according to claim 24, wherein said oxetane has the structural formula (1):

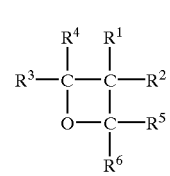

where $R^1$, $R^2$, $R^3$, $R^4$, $R^5$, and $R^6$ each independently represents a hydrogen atom, a hydroxyl group, an alkyl group, an alkenyl groop, an aromatic group, a halogen group, a substituted alkyl group, a substituted alkenyl group, or a substituted aromatic group.

29. A process for producing a water-absorbing agent according to claim 24, wherein said imidazolidinone compound has the structural formula (5):

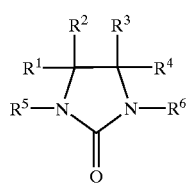 (5)

where $R^1$, $R^2$, $R^3$, $R^4$, $R^5$, and $R^6$ each independently represent a hydrogen atom, a hydroxyl group, an alkyl group, an alkenyl group, an aromatic group, a halogen group, a substituted alkyl group, a substituted alkenyl group, or a substituted aromatic group.

30. A process for producing a water-absorbing agent according to claim 1, wherein said water-absorbent resin is a water-insoluble crosslinked polymer.

31. A process for producing a water-absorbing agent according to claim 1, wherein said water-absorbent resin has a water-extractable content of not more than 40 wt %.

32. A process for producing a water-absorbing agent according to claim 1, wherein said water-absorbing resin is in the form of particles.

33. A process for producing a water-absorbing agent according to claim 13, wherein said water-absorbing resin is a water-insoluble crosslinked polymer.

34. An absorbing agent according to claim 13, wherein said water-absorbing resin has a water-extractable content of not more than 40 wt %.

35. An absorbing agent according to claim 13, wherein said absorbing agent is in the form of particles.

* * * * *